Patented Sept. 10, 1940

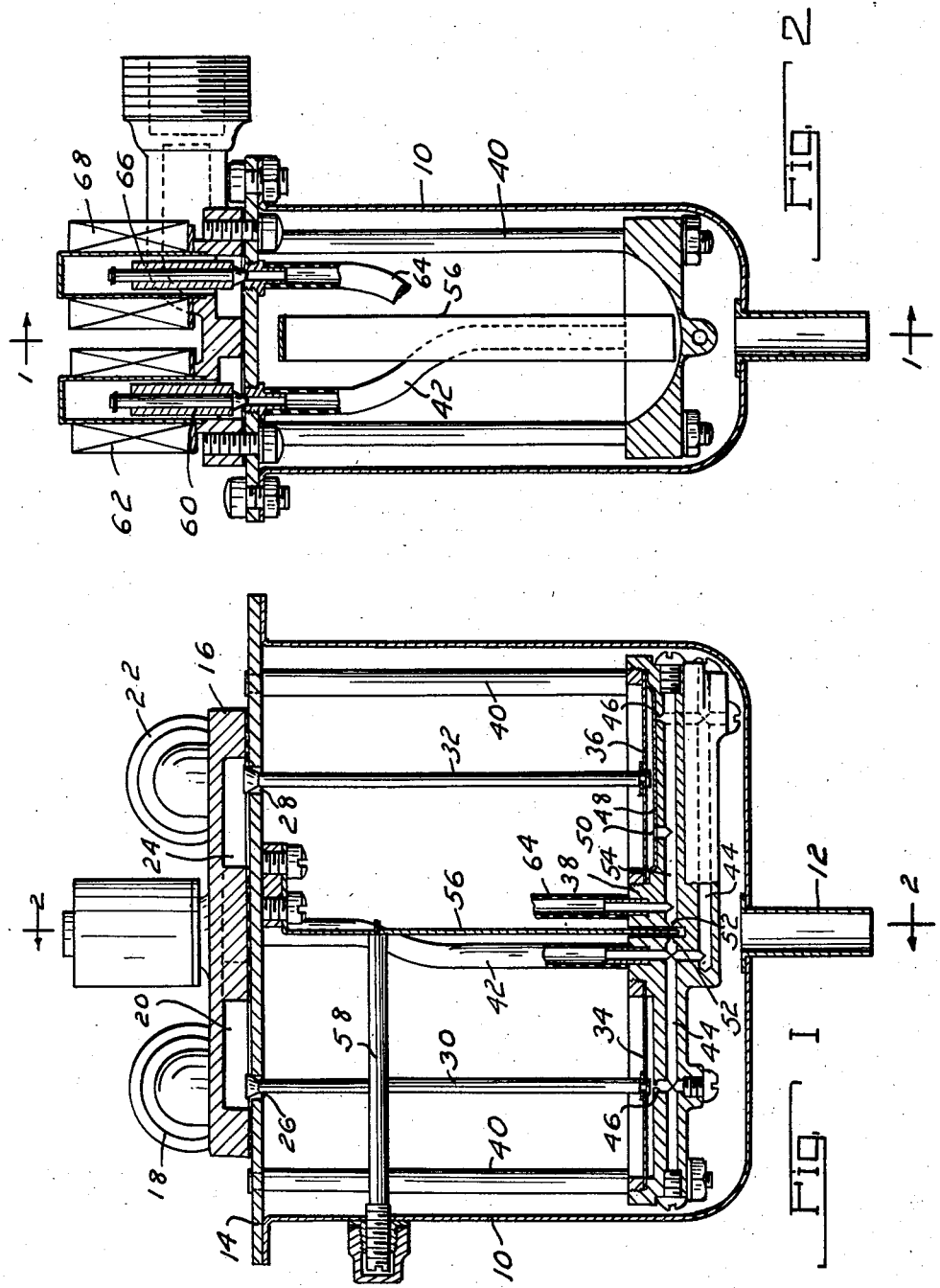

2,214,148

UNITED STATES PATENT OFFICE 2,214,148

MIXING DEVICE

Ray W. Scott, Detroit, Mich., assignor to Bendix Home Appliances, Inc., South Bend, Ind., a corporation of Delaware Application February 11, 1938, Serial No. 189,968

4 Claims. (Cl. 236—12)

This invention relates to mixing devices and more particularly to automatic devices for mixing hot and cold fluids such as water to maintain a constant temperature.

One of the objects of the invention is to provide a mixing device in which admission of fluid is controlled by power means energized by the fluid itself. For example, in a water mixing device control valves are provided for the hot and cold water and are operated through diaphragms or the like by the pressure of the water.

Another object of the invention is to provide a mixing device for hot and cold fluids in which admission and proportioning of the fluids is controlled by power devices which are controlled in response to the temperature of the mixed fluids. According to one desirable arrangement the power devices are operated by the fluid itself and have bleeds controlled by a bimetal thermostat in the mixing chamber.

Another object of the invention is to provide a mixing device for hot and cold fluids in which a mixture at a predetermined temperature may be obtained, or one fluid alone may be obtained regardless of its temperature. Preferably the device includes control means arranged for remote control.

Other objects, advantages and novel features of the invention will be apparent from the following description when read in connection with the accompanying drawing, in which:

Figure 1 is a section on the line 1—1 of Figure 2 of a mixing device embodying the invention; and Figure 2 is a section on the line 2—2 of Figure 1.

The invention is illustrated in connection with a device for mixing hot and cold water to obtain a mixture at a predetermined temperature for use in connection with automatic washing machines or the like. It will be understood, however, that the invention is equally applicable to the mixing of any other desired fluids.

Referring more particularly to the drawing, there is shown a cup-shaped mixing chamber 10 having an outlet pipe 12 at its lower end and with its upper end closed by a plate 14. The plate 14 has secured thereto a head 16 formed with an inlet 18 for cold water communicating with a chamber 20 and an inlet 22 for hot water communicating with a chamber 24. The chambers 20 and 24 are connected to the mixing chamber through ports 26 and 28 respectively through which hot and cold water to be mixed are supplied.

Admission of water to the mixing chamber is controlled by valves 30 and 32 which are secured to flexible diaphragms 34 and 36 respectively, the diaphragms being carried by a casting 38 which is supported from a plate 14 on bolts 40.

The diaphragms are operated by the pressure of the water being mixed, and for this purpose a pipe 42 is provided connected to the chamber 20 which communicates with passages 44 which are connected to the space below the diaphragms 34 and 36 by restricted ports 46.

A second diaphragm 48 is provided under the diaphragm 36 having an opening 50 therein displaced from the port 46 so that the port 46 is normally closed. However, when fluid under pressure is supplied thereto, the diaphragm 48 will be lifted, permitting fluid to flow from the port 46 through the opening 50 to the space below the diaphragm 36.

The pressure acting on diaphragms 34 and 36 is relieved through restricted bleed ports 52 communicating with the diaphragm 34 through the passage 44 and with the diaphragm 36 through a passage 54 having an opening in register with the opening 50 in diaphragm 48. The bleed ports are preferably the same size as, or slightly larger than the restricted passages 46, so that less then full pressure will be exerted on the diaphragms and the valves will be less than fully opened when the ports 52 are unrestricted.

Control of the bleed ports 52 is effected by a bimetal thermostat strip 56 connected at its upper end to the plate 14, with its lower end lying between the two bleed ports 52. Tension on the strip may be adjusted by screw 58 extending through the mixing chamber 10 and engaging the strip at one end.

When the water or other fluid in the mixing chamber is at the desired temperature, the strip 56 will occupy a position midway between the bleed ports 52 so that pressure below both diaphragms 34 and 36 will be equal. If the temperature of the water should become too low, the strip will deflect to the right, as seen in Figure 1, to restrict the port 52 leading from diaphragm 36 and to move further away from the port leading to diaphragm 34. At this time the pressure will increase slightly below diaphragm 36 and will decrease below diaphragm 34, so that valve 30 will move toward its closed position and valve 32 will move toward its open position. This will decrease the amount of cold water being supplied and increase the amount of hot water, thereby increasing the temperature of the resultant mixture to the desired value.

In order to close both valves, the tube 42 is provided with a valve 60 normally closing the tube and adapted to be raised from its seat by a solenoid 62. When the valve 60 is closed, with the solenoid de-energized, no fluid will be supplied through the tube 42 and both valves 30 and 32 will be closed.

Under some conditions it may be desirable to supply one fluid alone without any mixture with other fluid. For example, hot water at maximum temperature may be desired. For this purpose there is provided a second tube 64 communicating with the hot water inlet chamber 24 and with the passage 54 leading to diaphragm 36. The tube 64 is controlled by a valve 66 which is operated by a solenoid 68.

When the solenoid 68 is energized to open valve 66, fluid under pressure will be supplied through the tube 64 to the passage 54 and will flow through the opening 50 in the diaphragm 48 to the space below the diaphragm 36. This will open valve 32, admitting only hot water to the mixing chamber, pressure under the diaphragm 36 being maintained regardless of the position of the strip 56 due to the fact that bleed port 52 is materially restricted. It will be noted that during this operation pressure acting on top of the diaphragm 48 presses it firmly against the port 46 to close this port.

Due to the fact that the solenoids 62 and 68 are not required to operate the main valves but only the small pilot valves 60 and 66, they need not be very powerful and can be controlled remotely with a small current.

While one embodiment of the invention has been illustrated and described in detail, it will be understood that many changes might be made therein, and it is not intended to limit the scope of the invention to the form shown nor otherwise than by the terms of the appended claims.

What is claimed is:

1. A mixing device for hot and cold water comprising a mixing chamber, hot and cold water inlets for said mixing chamber, valves controlling communication of said inlets with the mixing chamber, flexible diaphragms for operating said valves, a conduit for conducting fluid from one of said inlets to one side of both diaphragms to open both valves, means forming bleed passages from said one side of both diaphragms respectively, and thermostatic means responsive to the temperature of the water in the mixing chamber to control said bleed passages the other side of both diaphragms being exposed to pressure in the mixing chamber tending to close the first named valves.

2. A mixing device for hot and cold water comprising a mixing chamber, hot and cold water inlets for said mixing chamber, valves controlling communication of said inlets with the mixing chamber, flexible diaphragms for operating said valves, a conduit for conducting fluid from one of said inlets to one side of both diaphragms to open both valves, a second conduit to conduct fluid from one of said inlets to one only of said diaphragms to open one only of said valves, and valves to control said conduits, means forming bleed passages from said one said of both diaphragms respectively, and thermostatic means responsive to the temperature of water in the mixing chamber controlling said bleed passages the other side of both diaphragms being exposed to pressure in the mixing chamber tending to close the first named valves.

3. A mixing device for hot and cold water comprising a mixing chamber, hot and cold water inlets for said mixing chamber, valves controlling communication of said inlets with the mixing chamber, flexible diaphragms for operating said valves, a conduit for conducting fluid from one of said inlets to one side of both diaphragms to open both valves, a second conduit to conduct fluid from one of said inlets to one only of said diaphragms to open one only of said valves, and valves to control said conduits, solenoids to operate said last named valves, means forming bleed passages from said one side of the diaphragms, and a bimetal strip in the mixing chamber controlling said bleed passages the other side of both diaphragms being exposed to pressure in the mixing chamber tending to close the first named valves.

4. A mixing device comprising a mixing chamber formed with inlets for hot and cold water, independently operable valves controlling said inlets, a device in said chamber formed with a pair of passages connected to one of said inlets, independently operable diaphragms mounted on said device communicating on one side with the mixing chamber so as to be subjected to the pressure therein and on their other sides with said passages respectively, means forming spaced apart facing bleed ports from said passages, a bimetal strip mounted in the mixing chamber with its free end lying between said bleed ports, and connections respectively from said diaphragms to the valves.

RAY W. SCOTT.